United States Patent [19]

Francois

[11] 3,990,343
[45] Nov. 9, 1976

[54] RIVETS FOR SECURING END CONNECTORS TO CONVEYOR BELTS

[75] Inventor: Edgar Francois, Bethel, Conn.

[73] Assignee: Uniroyal Inc., New York, N.Y.

[22] Filed: Aug. 7, 1975

[21] Appl. No.: 602,739

Related U.S. Application Data

[60] Continuation of Ser. No. 367,269, June 5, 1973, abandoned, which is a division of Ser. No. 143,537, May 14, 1971, Pat. No. 3,742,557.

[52] U.S. Cl. .................................... 85/68; 85/1 P
[51] Int. Cl.² .................................... F16B 27/00
[58] Field of Search .................. 85/1 P, 68, 79, 18, 85/17, 10 E, 37, 86, 87, 38, 72, 63; 206/338, 340, 343, 344; 24/33 B

[56] References Cited
UNITED STATES PATENTS

| | | | |
|---|---|---|---|
| 2,309,887 | 2/1943 | De Camp | 85/10 E |
| 2,590,585 | 3/1952 | Temple | 85/37 |
| 2,990,739 | 7/1961 | Zifferer | 85/10 R X |
| 3,057,285 | 10/1962 | Wheeler | 85/10 R X |
| 3,176,358 | 4/1965 | Leflon | 24/33 B |
| 3,477,336 | 11/1969 | Thorpe | 85/68 |
| 3,487,745 | 1/1970 | Brunelle | 85/72 X |
| 3,552,258 | 1/1971 | Warner | 85/79 X |
| 3,742,557 | 7/1973 | Francois | 24/33 B |

FOREIGN PATENTS OR APPLICATIONS

| | | | |
|---|---|---|---|
| 914,548 | 5/1954 | Germany | 85/10 R |
| 1,226,837 | 10/1966 | Germany | 24/33 B |
| 735,406 | 8/1955 | United Kingdom | 85/10 E |

Primary Examiner—Roy D. Frazier
Assistant Examiner—Thomas J. Holko
Attorney, Agent, or Firm—Norbert P. Holler

[57] ABSTRACT

Rivets to be used for securing end connectors to cord-reinforced conveyor belts and having a body with a head at one end and a bore at the other end, are disclosed. To facilitate driving such a rivet through the belt, a sharp-pointed elongated mandrel is loosely fitted at one end of the body thereof into the bore at the end of the rivet and is releasably secured to the rivet body by a strip of adhesive tape. The mandrel body is thinner than and at least as long as the body of the rivet and has a conically flaring portion adjacent the end connected to the rivet. When the rivet and mandrel combination is driven through the belt, the mandrel forms a pilot hole which facilitates subsequent entry and passage of the rivet, and the tape is automatically stripped off as the rivet/mandrel juncture reaches the belt body, so that the mandrel self-releases from the rivet as soon as the bored end of the latter has fully passed through the belt. This abstract is not to be taken either as a complete exposition or as a limitation of the present invention, however, the full nature and extent of the invention being discernible only by reference to and from the entire disclosure.

6 Claims, 7 Drawing Figures

U.S. Patent    Nov. 9, 1976    3,990,343
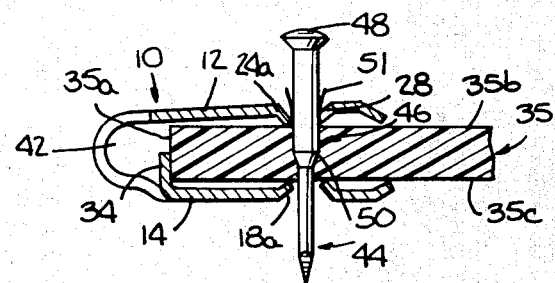
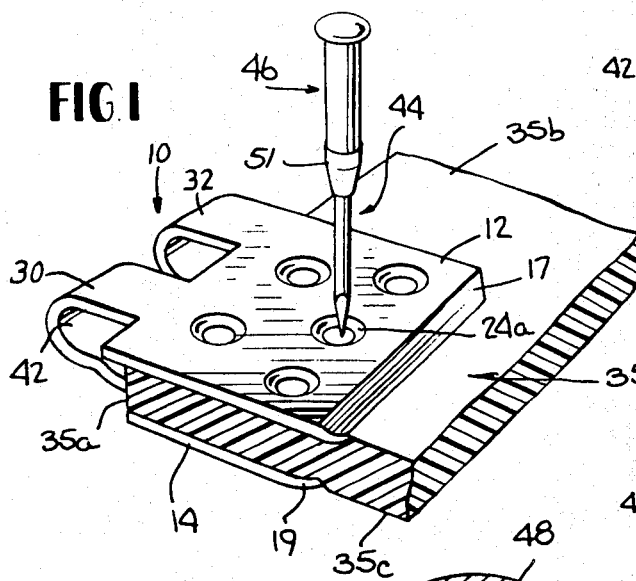
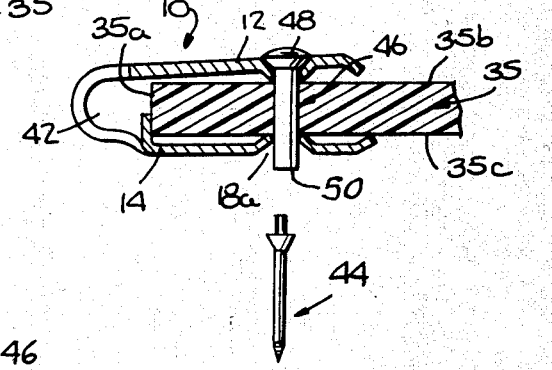
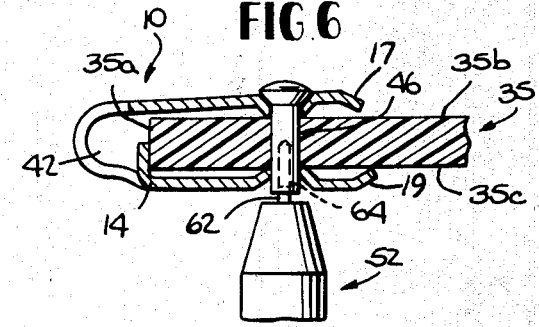
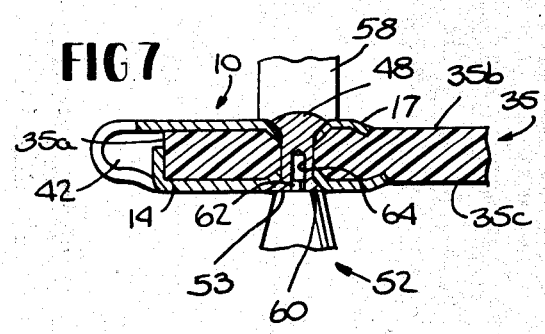
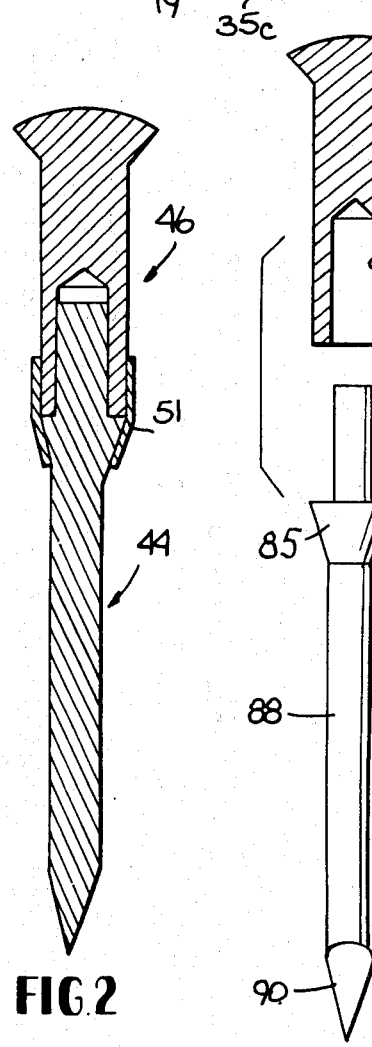

RIVETS FOR SECURING END CONNECTORS TO CONVEYOR BELTS

This application is a continuation of my prior copending application Ser. No. 367,269, filed on June 5, 1973 and now abandoned, which in turn is a division of an earlier application Ser. No. 143,537, filed May 14, 1971, now U.S. Pat. No. 3,742,557, issued July 3, 1973.

BACKGROUND OF THE INVENTION

The present invention relates generally to hinge fasteners for conveyor belts, and more particularly to the rivets used to secure the individual connector members of such fasteners to the conveyor belts.

As disclosed in the aforesaid U.S. Pat. No. 3,742,557, the entire contents of which are hereby incorporated herein by reference, a hinge fastener of the type here under consideration includes rigid, perferably U-shaped, paired connector members each adapted to be riveted to a respective end of the belt. Each connector member includes an upper and a lower plate connected to one another by a plurality of relatively narrower, laterally spaced, U-shaped portions, with these portions of any given connector member when riveted to the belt being arranged in an interfitting relation to the U-shaped portions of the paired connecter member. A hinge pin, usually a steel cable having a plastic coating or sheath thereon to reduce friction, is received in the housing defined by the aligned interiors of the U-shaped portions of the connector members to enable the same to pivot freely about the hinge pin relative to one another.

As will be clear to those skilled in the art, a rivet to be used in securing such a connector member to a belt should preferably be blunt-ended in order to facilitate the upsetting operation required to form the second rivet head after the rivet has been driven through the belt. Since a blunt rivet per se cannot be readily driven into the belt material, however, and, if it were so driven, would tend severely to damage the structure of the belt, i.e. either the elastomeric body material or the reinforcing cords incorporated therein or both, the use of sharp-pointed rivets has been suggested in the prior art. Representative of these are U.S. Pat. No. 3,176,358, British Pat. No. 860,147, and German Pat. No. 845,775. This approach, however, entails either losing the advantages of having the rivet blunt-ended or requiring special expedients, such as the formation of notches or weakened portions in the rivet body just behind the sharp end thereof, to enable the pointed end portion to be broken off preparatory to the performance of the upsetting operation.

In an attempt to combine the advantages of the two types of rivets while avoiding the disadvantages thereof, it was at first proposed, as is pointed out in the aforesaid U.S. Pat. No. 3,742,557, to affix to the unheaded end of a blunt rivet a sharp-pointed mandrel having an outer diameter greater than that of the rivet body. The underlying thought was that such a mandrel could easily penetrate the belt body and form a hole therein through which it would be followed by the attached rivet. Upon removal of the mandrel after full passage of the rivet through the belt, the blunt end of the rivet would then be accessible for the required upsetting operation. Nevertheless, this approach, too, had some drawbacks. With the outer diameter of the mandrel greater than that of the rivet body, the hole formed in the conveyor belt is oversized with respect to the rivet. As a result, the rivet is loosely received in the conveyor belt. The disadvantage of this is that a rivet installed in such an oversized hole may skew therein and may fail to properly fasten the associated connector member to the belt. Furthermore, the mandrel, being press-fitted or similarly secured to the rivet, is not self-extracting or self-releasing and remains affixed to the rivet until removed therefrom by a separate, subsequent operation. Thus, a considerable amount of time and labor has to be expended in removing the mandrel from the rivet, which results in ensuing higher product costs.

SUMMARY OF THE INVENTION

It is the object of the present invention, therefore, to provide a novel and improved rivet/mandrel combination by means of which the aforesaid drawbacks and disadvantages can be effectively avoided and by means of which the combined advantages of a blunt-ended rivet and a sharp-pointed mandrel in effecting the securing of a hinge fastener connector member to a conveyor belt can be fully realized.

Generally speaking, the objectives of the present invention are attained by the provision, in combination with a rivet having an axial bore formed in its blunt and unheaded end, of a specially constructed mandrel. In its preferred form, the mandrel has an elongated cylindrical body the outer diameter of which is appreciably smaller than that of the rivet body and just slightly less than the diameter of the said bore in the latter. At one end region, the mandrel body, the length of which is at least equal to that of the rivet body, is tapered to a sharp point for ease of penetration into the belt. The mandrel body is further provided, intermediate its ends but close to the second end region hereof, with a conically flaring section the outer diameter of which increases in the direction away from the pointed end up to a maximum at which it is equal to the outer diameter of the body of the rivet. The flaring section of the mandrel body terminates in and defines a flat annular shoulder surrounding the second end region of the mandrel body. By virtue of having a diameter as above described, the second end region of the mandrel body can be smoothly and freely slidably received in the aforesaid axial bore provided in the rivet body. Preparatory to being used, the rivet and mandrel are fitted together in this way and are secured to each other by an externally applied strip of adhesive tape or equivalent means overlying the rivet/mandrel juncture region.

In use, to insert the rivet into the belt, the pointed end of the mandrel member of the rivet/mandrel combination is first driven into the belt. The mandrel thus pierces the belt body without any destructive effect on either the rubber or the cord component thereof and forms a pilot hole which is initially somewhat narrower than the rivet body. Because of its reduced thickness, the mandrel has a correspondingly reduced surface area which minimizes the force required to drive it through the belt body. Ultimately, when the conical section of the mandrel body reaches the upper face of the belt, which occurs at just about the time or shortly after the pointed end of the mandrel emerges from the bottom face of the belt, the entrance end of the hole is expanded to permit the rivet to follow the mandrel into the belt, and simultaneously the adhesive tape is stripped off the juncture region of the rivet and mandrel combination. Since the pilot hole was already completely formed by that time, the force required to drive the rivet through the belt is also minimized. Thereafter, as soon as the unheaded end of the rivet body has passed completely through and emerges at the bottom face of the belt, the mandrel self-releases from the rivet, leaving the blunt end of the latter exposed for the upsetting operation. The invention thereby eliminates the need for the performance of an additional step in the labor cycle, i.e. the manual separation and removal of the mandrel from the rivet, and at the same time ensures that the rivet body is fully and snugly engaged over its entire length by the rubber of the belt so that skewing of the rivet in the belt and consequent improper securing of the fastener connector member to the belt is impossible.

BRIEF DESCRIPTION OF THE DRAWING

The foregoing and other objects, characteristics and advantages of the present invention will be more clearly understood from the following detailed description thereof when read in conjunction with the accompanying drawing, in which:

FIG. 1 is a fragmentary perspective view of an end of a conveyor belt (the cord reinforcement has been omitted for the sake of clarity) and shows a hinge fastener connector member in position for connection to the belt by means of a rivet then constituting a part of a rivet/mandrel combination according to the present invention;

FIG. 2 is an enlarged longitudinal sectional view of the rivet and mandrel combination shown in FIG. 1;

FIG. 3 is an exploded partly elevational, partly sectional, view of the rivet and mandrel combination shown in FIG. 1 but without the securing means thereof;

FIG. 4 is a fragmentary elevational, partly sectional, view of the end of the conveyor belt and shows the rivet/mandrel combination driven partly therethrough;

FIG. 5 is a similar view but shows the rivet completely driven through the belt and the mandrel disengaged and fallen away from the rivet;

FIG. 6 is another similar view but shows a rivet deforming member in engagement with the blunt end of the rivet protruding beyond the lower connector member plate; and FIG. 7 is yet another similar view but shows the second rivet head being formed by the rivet deforming member.

DETAILED DESCRIPTION OF THE INVENTION

Referring now to the drawing in greater detail, a hinge fastener of the type disclosed in U.S. Pat. No. 3,742,557, to which reference should be had for full details, includes a pair of connector members 10 (only one is shown in FIG. 1) each of which includes an upper plate 12 and a lower plate 14 having respective corresponding rows of holes 24a and 18a therein, the plates being interconnected with one another at one end by a plural spaced U-shaped portions 30 and 32, and having respective inwardly bent edges 17 and 19 at the other end. The U-shaped portions, which are adpated to be interfitted or interleaved with the corresponding elements of another connector member, define an interior housing 42 adapted to receive a hinge pin (not shown). The lower plate 14 also has an upstanding tongue 34 (FIGS. 4 to 7) extending toward the upper plate 12, the tongue providing a stop for the end edge 35a of a conveyor belt 35 when the latter is inserted endwise into the space between the plates 12 and 14.

To secure the connector member 10 to the end of the belt 35, one or more blunt-ended rivets 46 (FIGS. 2 and 3) are used, each such rivet preferably being made of stainless steel, straight steel, or an alloy such as Monel and having a body 82 with a head 48 at one end and an axial bore 64 extending inwardly from the other, i.e. the blunt and initially unheaded, end 50. As will be understood by those skilled in the art, each such rivet must pass through the body of the belt 35 as well as the respective aligned holes in the upper and lower plates 12 and 14 of the connector member 10. It is to the facilitation of the insertion of these rivets into and through the belt that the present invention is directed.

Accordingly, each rivet 46 is initially combined with an elongated cylindrical mandrel 44 having a body 88 tapered at one end 90 to a sharp point. The point of the mandrel can be round or circular, or it may be of a pyramid or square cross-section, but the latter configuration is preferred, being capable of providing a sharper mandrel member adapted to separate the cords or fibers of the belt more effectively and without damage thereto. The outer diameter of the mandrel body is somewhat smaller than that of the rivet body 82. Intermediate its ends but closer to the second one, the mandrel body has a flaring portion 85 which increases in diameter in the direction away from the pointed end 90, up to a maximum diameter substantially equal to that of the rivet body 82. The portion 84 of the mandrel body is of sufficiently reduced diameter to enable the smooth sliding entry of that portion into the bore 64 of the rivet 46. In the fully interfitted relation of the mandrel and rivet, the end 50 of the latter abuts against the shoulder or seat 86 defined by the flaring portion 85 of the mandrel around the reduced diameter body portion 84. The length of the mandrel body 88 from the shoulder 86 to the end 90 preferably is at least equal to or even somewhat greater than the length of the rivet body 82 from the underside of the head 48 to the end 50. The mandrel and rivet are releasably secured to one another by an adhering sleeve 51 (FIGS. 1 and 2) surrounding the juncture region of the combination and constituted, for example, by a strip of adhesive tape or an equivalent thereof. The physical properties of the sleeve 51 should be such, and the force of adhesion between the sleeve and the interfitted mandrel and rivet should be sufficient, that the latter elements will remain secured together during normal handling of the combination but that the sleeve can be readily disengaged therefrom due to the frictional forces exerted thereon by the belt material when the rivet/mandrel combination is driven through the belt.

In use, when a connector member 10 is to be attached to a conveyor belt 35, the respective end region of the latter is first interposed between the upper plate 12 and the lower plate 14 of the connector member, the upper plate 12 being positioned over belt face 35b, and the lower plate 14 being positioned under belt face 35c (FIG. 1). The pointed end 90 of the mandrel and rivet combination 44/46 is then inserted into and through the hole 24a in the upper connector member plate 12, and thereafter, with the connector member and the belt and region confined therein suitably supported, the mandrel/rivet combination, having the tape 51 still secured thereto, is driven into the belt. Thus, as the juncture region of the mandrel/rivet combination is forced into belt 35, the tape 51 is peeled back away from the conical surface 85 to at least beyond the said juncture region by virtue of the frictional resistance offered by the belt material, as illustrated diagrammatically in FIG. 4. The tape will thereafter normally remain trapped within the confines of the hole 24a in the upper connector plate 12 and under the rivet head 48, as is also illustrated diagrammatically in FIGS. 5, 6 and 7. With the tape 51 so stripped away, of course, the mandrel 44 separates automatically from the rivet 46 (FIG. 5) as soon as the bottom edge portion 50 of the rivet has passed through the bottom of the belt and the hole 18a in the lower connector member plate 14. Thus, mandrel 44 is self-extracting or self-releasing from rivet 46.

The rivet 44 is then secured in place by an upsetting operation utilizing, for example, a suitable rivet deforming member 52. The tip 62 of the rivet deforming member 52 is first inserted in the now accessible open end of the bore 64 of the rivet 46. Thereafter, the head 48 of the rivet is hammered by means of a suitable tool 58 (FIG. 7) to spread the metal at the end 50 of the rivet into the form of a flange or second head 53 within the confines of the hole 18a. As a result, the connector member plates 12 and 14 are pressed toward one another and clamped to the end region of the belt 35, with their free end edges 17 and 19 biting slightly into the respective belt surfaces 35b and 35c.

It will be apparent from the foregoing that, since the maximum outer diameter of the mandrel 44 in the region of the flared portion 86 thereof is substantially equal to the outer diameter of the body 82 of the rivet 46, the diameter of the opening formed by the mandrel in the belt 35 is equal to the diameter of the rivet body, so that there is substantially no clearance therebetween. Thus, the wall of the opening in the conveyor belt 35 will be in full engagement with the rivet body. Skewing and improper positioning of the rivet in the belt and relative to the connector member 10 is effectively eliminated, therefore, ensuring a proper fastening of the connector member to the belt. At the same time, the force required to drive the rivet through the belt is efficaciously minimized.

While the rivet and mandrel depicted in FIGS. 2 and 3 are the preferred embodiments thereof, it will be obvious to those skilled in the art that the mandrel may be constructed without a seat-defining flared portion, i.e. with an entirely cylindrical body (other than at the pointed end 90) adapted to have one end region thereof received in the bore of the rivet. In conjunction therewith, the rivet will then have the blunt end thereof beveled to facilitate its entry into the belt.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. Rivet means for use in securing a hinge fastener connector member to a cord-reinforced conveyor belt having a body of elastomeric material, said rivet means comprising:

a. a mandrel member having an elongated substantially cylindrical body with a first end portion tapered to a point for penetrating through the belt body with a minimized risk of causing damage to the reinforcing cord structure, and a second end portion axially spaced from said first end portion;

b. a rivet member having a body sufficiently long to extend fully through the thickness of the belt body and provided with a head at one end and an axial bore at its other end, said bore being dimensioned to loosely slidably receive said second end portion of said body of said mandrel member, and said rivet member being adapted to be spread at said other end for formation of a second head;

c. the diameter of said mandrel member over the length of said body thereof between said first and second end portions being less than the outer diameter of said body of said rivet member, and said body of said mandrel member being provided intermediate said first and second end portions thereof and adjacent the latter with a conically flaring portion defining an annular shoulder facing toward said second end portion so as to constitute a seat for the bored end of said rivet member, said conically flaring portion of said body of said mandrel member increasing in diameter from a minimum value equal to said diameter of said body of said mandrel member to a maximum value just about equal to said outer diameter of said body of said rivet member, thereby to constitute a means for spreading the hole made in the belt body by said mandrel member to an extent just sufficient to admit said rivet member; and d. adhesive sleeve-like means externally adhered to both said body of said rivet member and said conically flaring portion of said body of said mandrel member at the region of the juncture therebetween for releasably securing said members to one another with said second end portion of said body of said mandrel member received in said bore of said rivet member, the adhesive strength of said adhesive sleeve-like means being such that the latter is adapted to be stripped from at least said conically flaring portion of said body of said mandrel member and away from said juncture region of said bodies of said members as said juncture region enters the belt body upon the rivet means being forced into and through the belt body, thereby to enable said mandrel member automatically to self-release from said rivet member as soon as the bored end of the latter has fully penetrated through the belt body.

2. Rivet means as claimed in claim 1, wherein said adhesive sleeve-like means comprises an adhesive tape wound about and adhered to the sections of the peripheral surfaces of both said rivet member and said mandrel member adjacent said region of the juncture therebetween.

3. Rivet means as claimed in claim 1, wherein said adhesive sleeve-like means comprises an internally adhesive sleeve surrounding and adhered to the sections of the peripheral surfaces of both said rivet member and said mandrel member adjacent said region of the juncture therebetween.

4. Rivet means for use in securing a hinge fastener connector member to a cord-reinforced conveyor belt having a body of elastomeric material, said rivet means comprising:

a. a mandrel member having a substantially cylindrical body with a first end portion tapered to a point for penetrating through the belt body with a minimized risk of causing damage to the reinforcing cord structure, and a second end portion axially spaced from said first end portion;

b. a rivet member having a body sufficiently long to extend fully through the thickness of the belt body and provided with a head at one end and an axial bore at its other end, said bore being dimensioned to loosely slidably receive said second end portion of said body of said mandrel member, and said rivet member being adapted to be spread at said other end for formation of a second head;

c. the diameter of said mandrel member over the length of said body thereof between said first and second end portions being less than the outer diameter of said body of said rivet member, and said body of said mandrel member being provided intermediate said first and second end portions thereof and adjacent the latter with a conically flaring portion defining an annular shoulder facing toward said second end portion so as to constitute a seat for the bored end of said rivet member, said conically flaring portion of said body of said mandrel member increasing in diameter from a minimum value equal to said diameter of said body of said mandrel member to a maximum value just about equal to said outer diameter of said body of said rivet member, thereby to constitute a means for spreading the hole made in the belt body by said mandrel member to an extent just sufficient to admit said rivet member;

d. the length of said body of said mandrel member from said shoulder to said point of said first end portion being at least equal to the length of said body of said rivet member; and e. adhesive sleeve-like means externally adhered to both said body of said rivet member and said conically flaring portion of said body of said mandrel member at the region of the juncture therebetween for releasably securing said members to one another with said second end portion of said body of said mandrel member received in said bore of said rivet member, the adhesive strength of said adhesive sleeve-like means being such that the latter is adapted to be stripped from at least said conically flaring portion of said body of said mandrel member and away from said juncture region of said bodies of said members as said juncture region enters the belt body upon the rivet means being forced into and through the belt body, thereby to enable said mandrel member automatically to self-release from said rivet member as soon as the bored end of the latter has fully penetrated through the belt body.

5. Rivet means as claimed in claim 4, wherein said adhesive sleeve-like means comprises an adhesive tape wound about and adhered to the sections of the peripheral surfaces of both said rivet member and said mandrel member adjacent said region of the juncture therebetween.

6. Rivet means as claimed in claim 4, wherein said adhesive sleeve-like means comprises an internally adhesive sleeve surrounding and adhered to the sections of the peripheral surfaces of both said rivet member and said mandrel member adjacent said region of the juncture therebetween.

* * * * *